US012768524B2

(12) United States Patent
Grumbrecht et al.

(10) Patent No.: US 12,768,524 B2
(45) Date of Patent: Oct. 20, 2026

(54) OMNI-DIRECTIONAL WORK LIGHT

(71) Applicant: Hilti Aktiengesellschaft, Schaan (LI)

(72) Inventors: Sven Grumbrecht, Shanghai (CN); Edison Wang, Nantong (CN)

(73) Assignee: Hilti Corporation, Schaan (LI)

( * ) Notice: Subject to any disclaimer, the term of this patent is extended or adjusted under 35 U.S.C. 154(b) by 0 days.

(21) Appl. No.: 18/874,001

(22) PCT Filed: May 31, 2023

(86) PCT No.: PCT/EP2023/064498
§ 371 (c)(1),
(2) Date: Dec. 11, 2024

(87) PCT Pub. No.: WO2023/241911
PCT Pub. Date: Dec. 21, 2023

(65) Prior Publication Data

US 2025/0362006 A1 Nov. 27, 2025

(30) Foreign Application Priority Data

Jun. 13, 2022 (CN) ........................ 202210661417.7

(51) Int. Cl.
*F21V 21/06* (2006.01)
*F21V 15/01* (2006.01)
*F21V 21/22* (2006.01)

(52) U.S. Cl.
CPC .............. *F21V 21/06* (2013.01); *F21V 15/01* (2013.01); *F21V 21/22* (2013.01)

(58) Field of Classification Search
CPC ............... F21V 15/00–04; F21V 21/06; F21V 21/14–30
See application file for complete search history.

(56) References Cited

U.S. PATENT DOCUMENTS 9,170,006 B2 * 10/2015 Cugini .................... F21V 21/30
2002/0048739 A1 4/2002 Chu
(Continued)

FOREIGN PATENT DOCUMENTS

DE 20 2020 100 258 U1 3/2020
WO WO-2021016196 A1 * 1/2021 ............ F21V 21/406

OTHER PUBLICATIONS

International Search Report (PCT/ISA/210) issued in PCT Application No. PCT/EP2023/064498 dated Sep. 11, 2023 (3 pages).
(Continued)

*Primary Examiner* — Jason M Han
(74) *Attorney, Agent, or Firm* — Crowell & Moring LLP

(57) ABSTRACT

An omni-directional work light includes an elongated body having a longitudinal axis and a light head assembly connected to a top end of the elongated body. The light head assembly includes a light source with a transparent cover and a light socket where the light socket defines a radial plane perpendicular to the longitudinal axis. A plurality of legs are pivotally connected to the elongated body and movable between a folded position in which the plurality of legs are folded against the elongated body and an unfolded position in which a respective distal end of the plurality of legs is unfolded away from the elongated body. A protective member is disposed below the light socket where a projection of the transparent cover on the radial plane is within a projection range of the protective member on the radial plane.

11 Claims, 6 Drawing Sheets

(56) References Cited

U.S. PATENT DOCUMENTS

| | | | |
|---|---|---|---|
| 2013/0128565 | A1 | 5/2013 | Cugini et al. |
| 2014/0301066 | A1 | 10/2014 | Inskeep |
| 2020/0326059 | A1 | 10/2020 | Larrimore |
| 2023/0110944 | A1 | 4/2023 | Cornell et al. |

OTHER PUBLICATIONS

Written Opinion (PCT/ISA/237) issued in PCT Application No. PCT/EP2023/064498 dated Sep. 11, 2023 (9 pages).

* cited by examiner

OMNI-DIRECTIONAL WORK LIGHT

BACKGROUND AND SUMMARY OF THE INVENTION

The present invention relates to a luminaire for illuminating a work area for construction engineering, and in particular to a portable work light that can provide wide illumination coverage.

Portable work lights are used to provide illumination to work areas including, for example, construction sites, workshops, basement areas, outdoor spaces or spaces without electricity. The work lights typically take the form of one or more work light heads mounted on a base which may form a stand for placing the work light on the ground or a flat work surface. Optionally, the base may be designed to be able to be mounted on a tripod. However, working conditions in these work areas are often difficult, for example, there is uneven terrain or a lack of external power lights, so it is often necessary to move or adjust the work light in terms of position, light head height, etc., and the work light may even be accidentally tipped over during construction.

Existing portable work lights typically have a directional work light head which illuminates an area defined in a particular direction. In order to provide wider coverage or more light, a common form of the work light comprises two or more work light heads which are mounted on the same base and provide illumination in different directions. In some cases, the directional nature of the work light is undesirable. For example, when two or more construction workers are working in the same room, the workers need construction work lights to illuminate their respective work areas. Therefore, omni-directional work lights that can provide comprehensive 360-degree illumination are increasingly widely used. In order to achieve illumination without blind spots, a large-volume light head is required; however, a light head assembly is often fragile and is likely to be damaged, especially with regard to a large-volume light head which, when placed on an uneven surface, is prone to tipping over, thus, the drop resistance of the omni-directional work light is crucial. Existing omni-directional work lights often require a complex anti-tipping structure to protect the light head assembly from being damaged when the work light is tipped over.

The technical problem to be solved by the present invention is to provide an omni-directional work light, which can not only be easily moved and adjusted, but can also have good drop resistance and provide wide illumination coverage.

To solve the above technical problem, a technical solution of the present invention is as follows:

an omni-directional work light, which comprises: an elongated body having a longitudinal axis; a light head assembly connected to a top end of the elongated body, the light head assembly comprising a light source with a transparent cover, and a light socket, the light socket defining a radial plane perpendicular to the longitudinal axis; and a plurality of legs pivotally connected to the elongated body and movable between a folded position, in which the plurality of legs are folded against the elongated body, and an unfolded position, in which distal ends of the plurality of legs are unfolded away from the elongated body, wherein a protective member is provided below the light socket, and the projection of the transparent cover on the radial plane is within a projection range of the protective member on the radial plane.

In the omni-directional work light of the present invention, since there is a protective member with a larger radial projection coverage below the light socket, when the work light is tipped over, the protective member will touch the ground earlier than the transparent light cover which is likely to be damaged, thereby providing effective protection for the light head assembly.

According to an embodiment of the present invention, the protective member is configured as a collar extending substantially parallel to the radial plane, the collar having a substantially circular or polygonal periphery. In this way, the protective member of the present invention is constructed in the simplest way. In particular, the transparent cover is generally circular, and the collar with an annular periphery has a radial dimension larger than that of the transparent cover, so that a simple and attractive protective member is formed. A collar with a polygonal periphery can provide an anti-rolling function when the work light is placed horizontally on the ground in a non-use state.

According to a preferred embodiment of the present invention, at least part of the periphery of the protective member is provided with a flange extending parallel to or at an angle to the longitudinal axis. The flange at least partially surrounds the light socket to a certain extent, so that it is possible to provide more secure protection when the work light is tipped over.

According to another embodiment of the present invention, the protective member is configured to be in the shape of a bowl, the bowl shape extending radially outward from the center of the bottom of the bowl connected to the light socket, and along the longitudinal axis towards the transparent cover, so as to at least partially surround the light socket. The bowl-shaped protective member makes the omni-directional work light of the present invention both attractive in appearance and practical. In addition, since the side surface of the bowl-shaped protective member has curvature, when the protective member first touches the ground, it can absorb the impact energy more efficiently, thereby better protecting the light head assembly.

According to another embodiment of the present invention, the protective member comprises a plurality of first portions respectively corresponding to the positions of the plurality of legs, and a plurality of second portions each corresponding to the position between two adjacent legs, the plurality of first portions being successively spaced apart by the plurality of second portions. The omni-directional work light of the present invention is provided with a plurality of legs which have folded and unfolded positions. When the work light is tipped over, different positions of the legs will affect the posture of tipping, thus, the portions of the protective member corresponding to the legs and the portions corresponding to the positions between the legs are different, so as to provide better drop resistance.

The protective member comprises a central ring connected to the bottom of the light socket, a connecting rib is further provided between the central ring and the first portion, and the connecting rib is provided with at least one protrusion which supports the bottom of the light socket. In this way, the first portion forms a firm and reliable connection and support between the protective member and the light socket. When the work light is tipped over, the protective member and the light head assembly will not be displaced from each other, so as to ensure that the light head assembly will not hit the ground when tipping over occurs.

The projection of the first portion on the radial plane has a first radial distance, and the projection of the second portion on the radial plane has a second radial distance, the first radial distance being less than the second radial distance. The first portion is generally closer to the center of the elongated body than the second portion, so that the second portion, which radially protrudes more, will be a primary contact area where the work light hits the ground. The first portion and the second portion with different radial distances can also prevent rotation of the omni-directional work light when same is placed horizontally on the ground in a non-use state.

When the legs are in the unfolded position, the transparent cover does not exceed a plane constituted by the radially outermost point of the second portion and the distal ends of two adjacent legs in the radial direction. When the work light is tipped over, the most likely case is that it falls to the ground around a connecting line between two legs, and at this time, it is the radial outermost point of the second portion that first touches the ground.

When the legs are in the unfolded position, the transparent cover does not exceed a further plane constituted by the distal end of the leg and the two radially outermost points of the first portion in the radial direction. Although less likely, in some extreme cases where the work light is supported by a single leg when being tipped over, the two radially outermost points of the first portion of the protective member and the distal end of the leg will constitute a further virtual plane touching the ground, and the transparent cover does not exceed the further virtual other plane in the radial direction, which ensures that the light head assembly will not hit the ground.

The second portions of the protective member are configured as a handle that is graspable by a user. Since the work light of the present invention has an adjustable height, there is a need for a simple way to move the light head assembly along the longitudinal axis. The second portions of the protective member directly form a handle, and the user can easily hold the handle with one hand to adjust the height of the light head assembly. Moreover, the second portions are a plurality of middle portions corresponding to the adjacent legs, thus, the handle also has a plurality of portions that can be held, and has an attractive shape and convenient operation.

According to an embodiment of the present invention, the protective member is integrally formed. The integrally formed protective member not only has a better drop resistance performance, but is also simpler and more convenient to manufacture and mount.

The embodiments mentioned can be better understood through the following detailed description while the drawings are read. It is emphasized that the various components are not necessarily drawn to scale. In fact, the size can be increased or decreased at will for the sake of clarity of discussion. In the drawings, the same reference numerals refer to the same elements.

DETAILED DESCRIPTION OF THE DRAWINGS

Hereinafter, an omni-directional work light according to an embodiment of the present invention will be described with reference to FIGS. 1 to 8. The expressions "front", "rear", "above", "below", "left" and "right" in the present invention are used, throughout this description, to define various parts of the omni-directional work light when arranged in an orientation in which it is expected to be used, such as the orientation shown in FIGS. 1-3.

Figure 1:
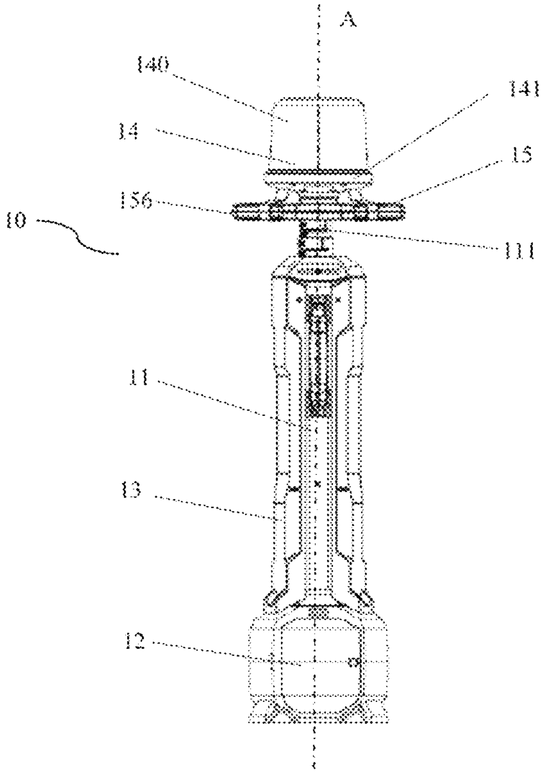
FIG. 1 shows an overall schematic diagram of an exemplary omni-directional work light (in a folded position) according to the present invention.
Figure 2:
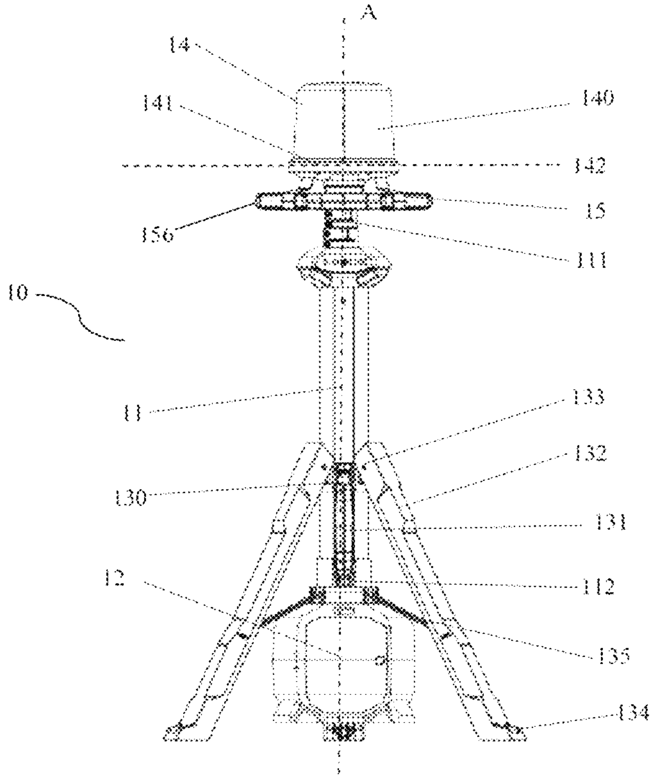
FIG. 2 is an overall schematic diagram of the omni-directional work light shown in FIG. 1 in an unfolded position.
Figure 3:
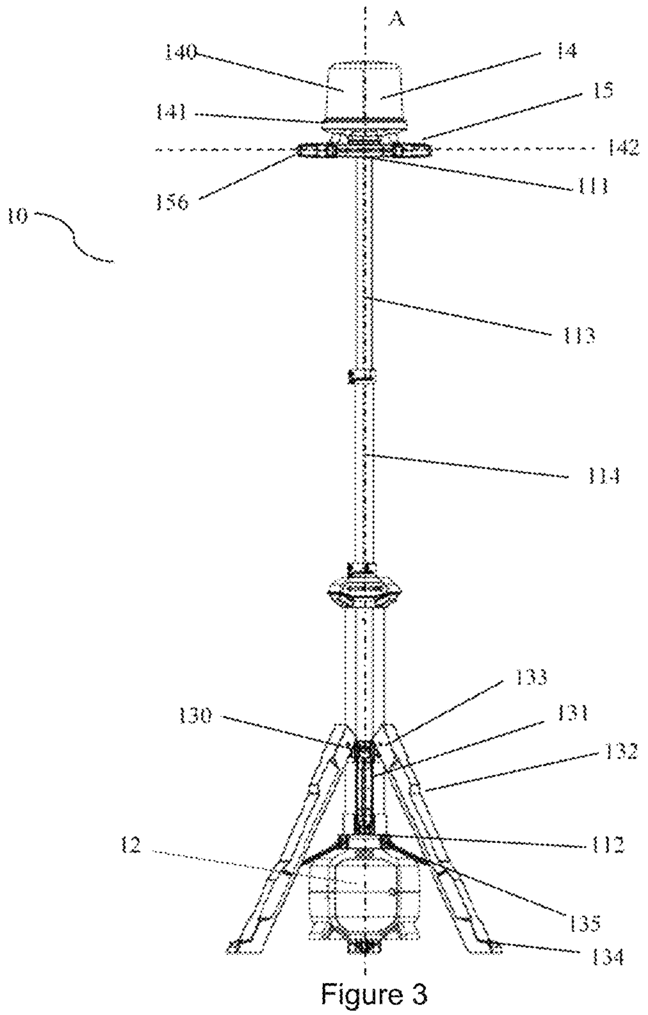
FIG. 3 is an overall schematic diagram of the omni-directional work light shown in FIG. 2 in the unfolded position in another working state.

FIGS. 1 to 3 show an embodiment of an omni-directional work light according to the present invention. The work light 10 comprises an elongated body 11, a base 12, a support assembly 13 and a work light head assembly 14. The work light 10 may be configured to be in a folded position, as shown in FIG. 1, or an unfolded position (operating position), as shown in FIGS. 2 and 3. In the folded position, the work light 10 is relatively compact for easy storage and transportation. In the unfolded position, the work light 10 may stand upright on the ground.

With continued reference to FIGS. 1 and 2, the elongated body 11 comprises a top end 111 and a bottom end 112 opposite to the top end 111. The elongated body 11 further comprises a longitudinal axis A extending through the top end 111 and the bottom end 112. With reference to FIG. 3, in the illustrated embodiment, the elongated body 11 is a telescopic body which comprises a plurality of elongated telescopic members or extension rods to allow the body 11 to extend in a lengthwise direction. The body 11 shown comprises a first extension rod 113 and a second extension rod 114. In another embodiment, any number of extension portions may be used. The extension rods 113, 114 each comprise a longitudinal axis, and the longitudinal axes of the extension rods 113, 114 are coaxial with the longitudinal axis A of the elongated body 11. The extension rods 113, 114 are selectively secured in the unfolded position (FIGS. 2 and 3) or in the folded position (FIG. 1) or anywhere between the unfolded position and the folded position by means of a sleeve structure.

Additionally, electrical wires (not shown) are housed within the elongated body 11 and the extension rods 113, 114 to electrically connect the head assembly 14 to the base 12, so as to provide electrical power to the head assembly 14. The base 12 may be connected to a battery or an AC power source to supply power to the work light 10.

The support assembly 13 comprises a collar 130, a main handle 131 and a plurality of legs 132. The collar 130 is connected around part of the elongated body 11. The collar 130 is movable (e.g., slidable) along the elongated body 11 in a direction parallel to the longitudinal axis A. The main handle 131 is connected to the collar 130 to move with the collar 130 along the elongated body 11 and parallel to the longitudinal axis A.

In the illustrated embodiment, the support assembly 13 comprises three legs 132. In another embodiment, the support assembly 22 may comprise any number of legs 132. Each leg 132 has a proximal end 133 and a distal end 134. The legs 132 are equally spaced circumferentially about 120 degrees apart from each other around the elongated body 11. Each leg 132 is hingedly connected to the collar 130 at the proximal end 133 of the leg 132 to allow the distal end 134 of the leg 132 to pivot away from the body 11. Additionally, each leg 132 may also be pivotally connected to the bottom end 112 of the body 11 via a leg link 135, thereby limiting the outward pivotal movement of the leg 132. The legs 132 are connected to the collar 130 and the leg links 135 such that when the collar 130 is adjacent to the top end 111 of the body 11, the work light 10 is in the folded position (FIG. 1). When the collar 130 is adjacent to the bottom end 112 of the body 11, the work light 10 is in the unfolded position (operating position) (FIGS. 2 and 3). In the unfolded position, the distal ends 114 of the legs 132 are remote from the body 11 and spaced apart to support the work light 10 on the ground.

In the illustrated embodiment, the light head assembly 14 comprises a light source with a transparent cover 140, and a light socket 141. The light source may comprise a plurality of light-emitting diodes (LEDs) arranged in an array to provide uniform illumination to an area. In another embodiment, various light sources may be used in place of the LEDs. In the illustrated embodiment, the transparent cover 140 is a cylinder or frustum having a circular cross-section. However, this particular shape is not necessarily the case. For example, in other embodiments, the transparent cover 140 may be rectangular or polygonal, and its cross-section may take other forms for reasons such as aesthetic appearance, structural rigidity, or manufacturability.

The light socket 141 is connected to the elongated body 11. More specifically, the center of the bottom of the light socket 141 is fitted over the top end 111 of the elongated body 11, so that the height of the light head assembly 14 can be adjusted by means of the extension rods 113, 114. In the illustrated embodiment, the light socket 141 is generally in the shape of a disc, and the transparent cover 140 is mounted on an upward facing surface of the disc. Preferably, the light socket 141 has a shape matching the transparent cover 140, so that the transparent cover 140 can be simply and firmly mounted on the light socket 141. An upper surface of the light socket 141 that receives the transparent cover 140 defines a radial plane 142 perpendicular to the longitudinal axis, so that when the work light 10 is in an upright working state, the light head assembly 14 is also substantially upright, which is more conducive to providing wide illumination coverage.

Figure 4:
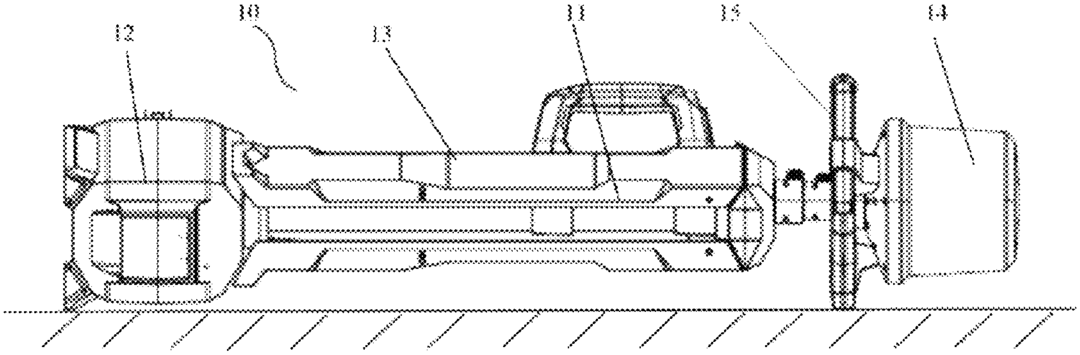
FIG. 4 is an overall schematic diagram of the omni-directional work light shown in FIG. 1 when being tipped over.

The work light 10 of the present invention further comprises a protective member 15 disposed below the light socket 141 for protecting the light head assembly 14, especially the transparent cover 140, from being damaged when the work light 10 is tipped over and hits the ground. Due to its light transmittance requirement, the transparent cover 140 is usually made of a thin and fragile material. With reference to FIG. 4, in order to achieve the aforementioned protective function, the protective member 15 should touch the ground before the light head assembly 14 when the work light 10 is tipped over. Preferably, the protective member 15 should ensure that the transparent cover 140 will not touch the ground when the work light 10 is tipped over, so that the transparent cover and the light source in the transparent cover can be prevented from being damaged due to impact. According to an embodiment of the present invention, the projection of the transparent cover 140 on the radial plane 142 is within a projection range of the protective member 15 on the radial plane 142. Since the shape of the protective member 15 can be chosen in a number of ways, the projection of the protective member 15 on the radial plane 142 is an area enclosed by an outermost circumferential edge of the protective member 15 in the radial surface perpendicular to the longitudinal axis A. The projection of the transparent cover 140 on the radial plane 142 is an area enclosed by an outermost circumferential edge of the transparent cover 140 in the radial surface perpendicular to the longitudinal axis A. When the projected area of the protective member 15 is larger than the projected area of the transparent cover 140, the protective member 15 protrudes more with respect to the longitudinal axis A than the light head assembly 14. When the work light 10 is tipped over, its longitudinal axis A also rotates and gradually tends to be horizontal. Then, the protective member 15 is likely to touch the ground first, so that the light head assembly 14 will not hit the ground, thus protecting the light head assembly 14 from being damaged.

Figures 5A, 5B, 5C, 5D:
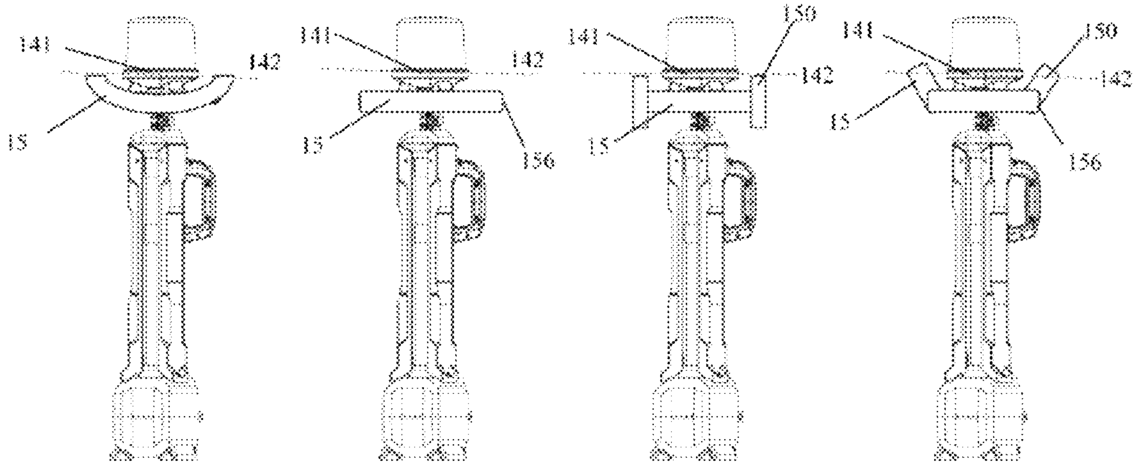
FIGS. 5*a*-5*d* are schematic diagrams of protective members of an exemplary omni-directional work light of the present invention.

FIGS. 5*a*-5*d* illustrate embodiments of alternative protective members 15. As shown in FIG. 5*a*, the protective member 15 is configured to be in the shape of a bowl, the bowl shape extending radially outward from the center of the bottom of the bowl connected to the light socket, and along the longitudinal axis towards the transparent cover 140, so as to at least partially surround the light socket 141. An advantage of the bowl-shaped protective member 15 is that it can at least partially surround the light socket 141, and even partially surround the transparent cover 140, so as to provide more reliable protection for the light head assembly 14. The bowl-shaped protective member makes the omnidirectional work light of the present invention both attractive in appearance and practical. In addition, since the side surface of the bowl-shaped protective member has curvature, when the protective member first touches the ground, it can absorb impact energy more efficiently, thereby better protecting the light head assembly 14.

The protective member 15 shown in FIG. 5*b* is configured as a collar extending generally parallel to the radial plane 142. The collar has a generally circular or polygonal periphery 156. Such a protective member 15 achieves the function of protecting the light head assembly with an extremely simple structure. In particular, the transparent cover is generally circular, and the collar with an annular periphery has a radial dimension larger than that of the transparent cover, so that a simple and attractive protective member is formed. A collar with a polygonal periphery can provide an anti-rolling function when the work light 10 is placed horizontally on the ground in a non-use state.

The protective member 15 shown in FIG. 5*c* is provided at least partly at its peripheral edge with a flange 150 extending parallel to the longitudinal axis. The longitudinally extending flange 150 shown makes it more likely that the protective member 15 will first touch the ground when the work light 10 is tipped over, and after hitting the ground, the protective member absorbs more impact energy, further improving the drop resistance of the work light 10.

FIG. 5*d* illustrates another embodiment of a protective member 15. What is different from the protective member shown in FIG. 5*c* is that the flange 150 extends at an angle to the longitudinal axis at at least part of the peripheral edge, e.g., extending obliquely upward as shown in the figure. In this way, when the work light 10 is tipped over, the obliquely extending flange 150 has a larger contact area with the ground when it hits the ground, has a larger buffer space, and is conducive to guidance of the work light 10 at the tipping position. It is more possible to prevent the relatively fragile transparent cover from touching the ground.

Figure 6:
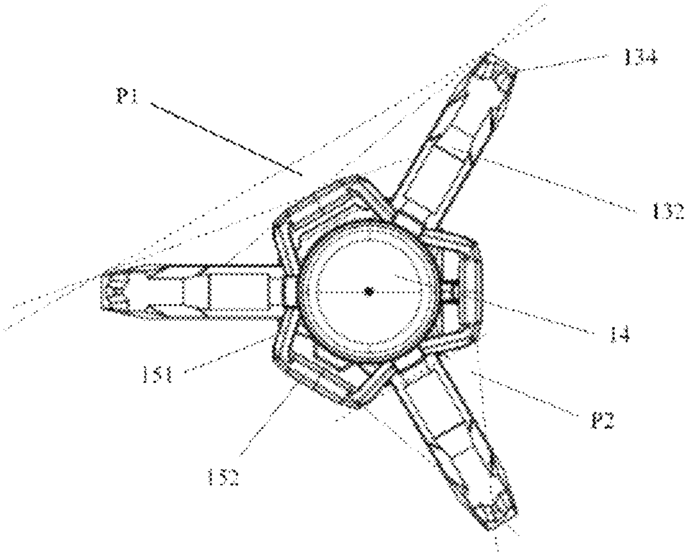
FIG. 6 is a partial schematic diagram of an omni-directional work light according to a preferred embodiment of the present invention.

With reference to FIG. 6 below, according to an embodiment of the present invention, the protective member 15 comprises a central ring 153 connected to the bottom of the light socket, and a connecting rib 154 is further provided between the central ring 153 and the first portion. The connecting rib 154 is provided with at least one protrusion 155, and the protrusion 155 supports the bottom of the light socket. In this way, the protective member 15 is firmly and reliably connected to and supports the light socket 141, and when the work light is tipped over, the protective member and the light head assembly will not be displaced from each other, so as to ensure that the light head assembly will not hit the ground when tipping over occurs.

Figure 7:
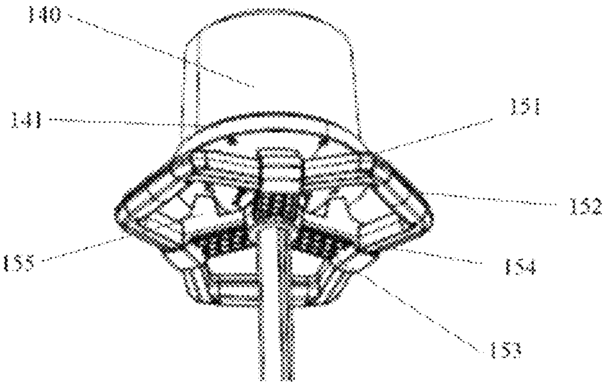
FIG. 7 is a top view of an exemplary omni-directional work light of the present invention shown in FIG. 6.

With further reference to FIGS. 6 and 7, the protective member 15 comprises a plurality of first portions 151 corresponding to the positions of the plurality of legs 132, and a plurality of second portions 152 each corresponding to the position between two adjacent legs 132. The plurality of first portions 151 are successively spaced apart by the plurality of second portions 152. In the illustrated embodiment, there are three legs 132, and the legs 132 are equally spaced circumferentially about 120 degrees apart from each other around the elongated body 11, thus, there are also three first portions 151 and three second portions 152, respectively, and the first portions 151 and the second portions 152 are successively spaced apart and arranged equidistantly along the axis.

Preferably, the projection of the first portion 151 on the radial plane 142 has a first radial distance, and the projection of the second portion 152 on the radial plane 142 has a second radial distance, the first radial distance being less than the second radial distance. As shown in FIG. 6, the first portion 151 and the second portion 152 have different shapes. For example, the second portion 152 is straight or arc-shaped and generally perpendicular to the longitudinal axis. More preferably, the second portion 152 is configured as a secondary handle that can be grasped by a user. Since the work light of the present invention has an adjustable height, there is a need for a simple way to move the light head assembly 14 along the longitudinal axis A. The second portions 152 of the protective member are directly configured as a handle, and the user can easily hold the handle with one hand to adjust the height of the light head assembly. In the embodiment of the present invention, the three second portions 152 correspond to the middle portions between the three adjacent legs 132 respectively, thus, the handle also has three portions that can be held and arranged at equal intervals in the circumferential direction, and has an attractive overall shape and convenient operation.

The first portion 151 has a radially concave shape, for example, may be a radially concave arc or two intersecting straight lines with the distance from the intersection point to the longitudinal axis being the smallest. In summary, the projection of the first portion 151 on the radial plane 142 has an area or shape closer to the longitudinal axis than the projection of the second portion 152 on the radial plane 142. The first portion is generally closer to the center of the elongated body than the second portion, so that the second portion, which radially protrudes more, will be a primary contact area where the work light hits the ground. The first portion 151 and the second portion 152 of different shapes allow the work light 10 to be prevented from rolling when placed on the ground (as shown in FIG. 4), and to absorb and transfer an impact force to the reinforced first portion upon impact.

Figure 8:
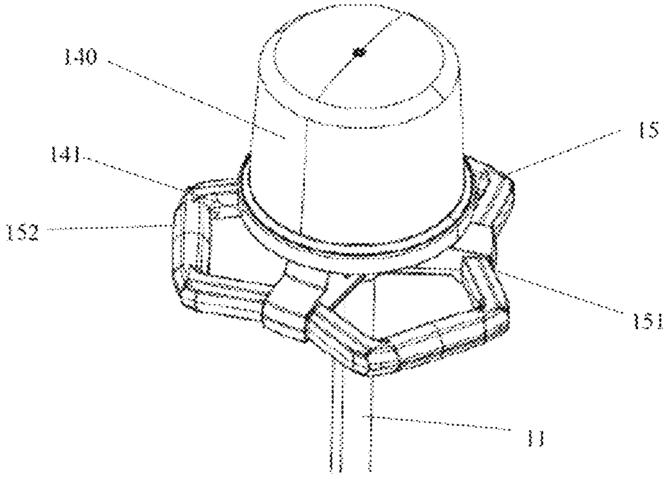
FIG. 8 is a schematic diagram of an exemplary omni-directional work light of the present invention shown in FIG. 6 from another viewing angle.

According to a preferred solution of the present invention, as shown in FIG. 8, the light head assembly 14 does not exceed a plane P1 constituted by the radially outermost point of the second portion 152 and the distal ends 134 of two adjacent legs in the radial direction. The plane P1 here refers to a virtual plane, which does not need to be formed or presented on the work light 10. When the work light 10 is tipped over, the most likely case is that it falls to the ground around a connecting line between two legs 132, and at this time, it is the radial outermost point of the second portion that first touches the ground. The fact that the light head assembly 14 does not exceed the extent of P1 in the radial direction ensures that the light head assembly 14 will not hit the ground when the work light is tipped over, thereby ensuring that the light head assembly will not be broken.

More preferably, when the legs 132 are in the unfolded position, the transparent cover 140 does not exceed a further plane P2 constituted by the distal end 134 of the leg and the two radially outermost points of the first portion 151 in the radial direction. Although less likely, in some extreme cases where the work light is supported by a single leg when being tipped over, the two radially outermost points of the first portion 151 of the protective member and the distal end 134 of the leg will constitute a further virtual plane P2 touching the ground. The transparent cover 140 does not exceed the further virtual plane P2 in the radial direction, which ensures that the light head assembly 14 will not hit the ground at any angle, and the protective member 15 can provide adequate protection for the light head assembly in any case.

According to a preferred embodiment of the present invention, the protective member 15 is integrally formed. More preferably, the protective member is integrally formed by a blow-moulding process. The flexible material properties of this integrally blow-moulded component may absorb the force when falling.

As mentioned above, although exemplary embodiments of the present invention have been described in the description with reference to the accompanying drawings, the present invention is not limited to the specific embodiments described above, and there may be many other embodiments, and the scope of the present invention should be defined by the claims and their equivalents.

The invention claimed is:

1. An omni-directional work light, comprising:

an elongated body having a longitudinal axis;

a light head assembly connected to a top end of the elongated body, wherein the light head assembly comprises a light source with a transparent cover and a light socket, wherein the light socket defines a radial plane perpendicular to the longitudinal axis;

a plurality of legs pivotally connected to the elongated body and movable between a folded position in which the plurality of legs are folded against the elongated body and an unfolded position in which a respective distal end of the plurality of legs is unfolded away from the elongated body; and a protective member disposed below the light socket and connected to the light socket, wherein the protective member is connected to the light socket when the omni-directional work light is in a folded position and the protective member remains connected to the light socket when the omni-directional work light is in an unfolded operating position and wherein a projection of the transparent cover on the radial plane is within a projection range of the protective member on the radial plane.

2. An omni-directional work light according to claim 1, wherein the protective member is configured as a collar extending substantially parallel to the radial plane and wherein the collar has a periphery that is circular or polygonal.

3. The omni-directional work light according to claim 2, wherein at least part of the periphery has a flange extending parallel to, or at an angle to, the longitudinal axis.

4. The omni-directional work light according to claim 1, wherein the protective member is configured in a shape of a bowl, wherein the bowl extends radially outward from a center of a bottom of the bowl that is connected to the light socket and extends along the longitudinal axis towards the transparent cover, and wherein the bowl at least partially surrounds the light socket.

5. The omni-directional work light according to claim 1, wherein the protective member comprises a plurality of first portions respectively corresponding to a position of the plurality of legs and a plurality of second portions each corresponding to a respective position between two adjacent legs, and wherein the plurality of first portions are successively spaced apart by the plurality of second portions.

6. The omni-directional work light according to claim 5, wherein the protective member comprises a central ring connected to a bottom of the light socket, wherein a connecting rib is disposed between the central ring and a first portion of the plurality of first portions, and wherein the connecting rib has at least one protrusion which supports the bottom of the light socket.

7. The omni-directional work light according to claim 5, wherein a projection of the plurality of first portions on the radial plane has a first radial distance, wherein a projection of the plurality of second portions on the radial plane has a second radial distance, and wherein the first radial distance is less than the second radial distance.

8. The omni-directional work light according to claim 5, wherein when the plurality of legs are in the unfolded position, the transparent cover does not exceed a plane constituted by a radially outermost point of the plurality of second portion and a respective distal end of two adjacent legs in a radial direction.

9. The omni-directional work light according to claim 5, wherein when the plurality of legs are in the unfolded position, the transparent cover does not exceed a plane constituted by the respective distal end of the plurality of legs and two radially outermost points of the plurality of first portions in a radial direction.

10. The omni-directional work light according to claim 5, wherein the plurality of second portions are each configured as a handle that is graspable by a user.

11. The omni-directional work light according to claim 1, wherein the protective member is integrally formed.

* * * * *